United States Patent [19]
Bütje et al.

[11] Patent Number: 5,723,404
[45] Date of Patent: Mar. 3, 1998

[54] PROCESS FOR THE PRODUCTION OF MIXED OXIDE POWDERS FOR CATALYSTS FOR THE REMOVAL OF NITROGEN OXIDES

[75] Inventors: Kai Bütje, Duisburg; Jürgen Kischkewitz, Ratingen; Rolf Michael Braun; Udo Holtmann, both of Krefeld; Peter-Joachim Barenthien, Duisburg, all of Germany

[73] Assignee: Bayer Aktiengesellschaft, Leverkusen, Germany

[21] Appl. No.: 649,924

[22] Filed: May 16, 1996

Related U.S. Application Data

[63] Continuation of Ser. No. 263,980, Jun. 22, 1994, abandoned.

[30] Foreign Application Priority Data

Jun. 29, 1993 [DE] Germany ................... 43 21 555.6

[51] Int. Cl.⁶ ............... B01J 21/06; B01J 101/50
[52] U.S. Cl. ............. 502/350; 502/306; 502/309; 423/239.1
[58] Field of Search ................... 502/305, 306, 502/309, 350; 423/239.1

[56] References Cited

U.S. PATENT DOCUMENTS

| | | | |
|---|---|---|---|
| 3,898,321 | 8/1975 | Marsh | 502/350 |
| 4,081,510 | 3/1978 | Kato et al. | 423/237 |
| 4,085,193 | 4/1978 | Nakajima et al. | 423/239 |
| 4,814,153 | 3/1989 | Kobayashi et al. | 423/213.2 |
| 4,814,318 | 3/1989 | Hums | 502/439 |
| 4,916,107 | 4/1990 | Brand et al. | 502/309 |
| 4,929,586 | 5/1990 | Hegedus et al. | 502/217 |
| 5,198,403 | 3/1993 | Brand et al. | 502/204 |
| 5,336,651 | 8/1994 | Yoshimoto et al. | 502/74 |

FOREIGN PATENT DOCUMENTS

| | | |
|---|---|---|
| 0159959 | 10/1985 | European Pat. Off. . |
| 0208434 | 1/1987 | European Pat. Off. . |
| 0208435 | 1/1987 | European Pat. Off. . |
| 0214085 | 3/1987 | European Pat. Off. . |
| 0256359 | 2/1988 | European Pat. Off. . |
| 0268265 | 5/1988 | European Pat. Off. . |
| 0292310 | 11/1988 | European Pat. Off. . |
| 0348768 | 1/1990 | European Pat. Off. . |
| 0371329 | 6/1990 | European Pat. Off. . |
| 0390059 | 10/1990 | European Pat. Off. . |
| 0472014 | 2/1992 | European Pat. Off. . |
| 0547663 | 6/1993 | European Pat. Off. . |
| 2219117 | 9/1974 | France . |
| 2677012 | 12/1992 | France . |
| 3439217 | 4/1986 | Germany . |

OTHER PUBLICATIONS

L. Lietti, et al., Appl. Catal., vol. B 3, pp. 13–35, (1993).
J.P. Chen, et al., J. Cat., vol. 125, pp. 411–420, (1990).
J.P. Chen, et al., Appl. Cat., vol. A 80, pp. 135–148, (1992).
G. Ramis, et al., Catalysis Lett., vol. 18, pp. 299–303, (1993).
C. Martin, et al., J. Cat. vol. 145, pp. 239–242, (1994).
C. Martin, et al., J. Cat., vol. 146, pp. 415–421, (1994).
C. Martin, et al., J. Cat., vol. 147, pp. 465–475, (1994).
Shikada et al., "Effect of Added Alkali Salts on the Activities of Supported Vandium Oxide Catalysts for Nitric Oxide Reduction", Chemistry Letters pp. 77–80 (1983).
Fujimoto et al., "Regeneration of $V_2O_5$–$TiO_2$ Catalysts for Nitrogen Monoxide Reduction Poisoned by Potassium Salts," Chemistry Letters pp. 515–518 (1983).
Ullman's Encyclopedia of Industrial Chemistry, 5th Ed., vol. A20 pp. 276–290, 1992.
Ullmann's Encyclopedia of Industrial Chemistry, 5th edition, volume A20, Pigments/Inorganic, p. 279, "Purification of the Hydrolysate".
Chemical Abstracts, Chemical Engineering, p. 8, Week 9018; HITG J04, 90–135526/18, JO 2083–034–A; "Prodn. of denitration catalyst –by treating catalyst raw material contg. titanium, vanadium, boron, etc. . . ", Babcock–Hitachi KK, Sep. 19, 1988.
European Patent Information and Documentation System, Aug. 23, 1994, EPIDOS INPADOC data base 4529, 9 pages.

*Primary Examiner*—Glenn Caldarola
*Assistant Examiner*—Alexander G. Ghyka
*Attorney, Agent, or Firm*—Sprung Kramer Schaefer & Briscoe

[57] ABSTRACT

A process for the production of a mixed oxide powder, that contains as chief constituent $TiO_2$ in the form of anatase and as minor constituents at least one of the catalytically active oxides $MoO_3$, $WO_3$ and $V_2O_5$, suitable for use as a catalyst for the removal of nitrogen oxides, comprising (a) partially neutralizing a titanium dioxide hydrate suspension containing sulphuric acid with an alkaline liquor to a pH value between about 4.0 and 6.0 at temperatures between about 20° and 100° C., (b) filtering the suspension from (a) to produce a filter cake and intensively washing the filter cake, (c) adding to the filter cake from (b) at least one water-soluble salt of at least one of the metals Mo, W and V in solid or dissolved form, and (d) drying the filter cake from (c) and calcining it at a temperature between about 300° and 750° C.

10 Claims, No Drawings

PROCESS FOR THE PRODUCTION OF MIXED OXIDE POWDERS FOR CATALYSTS FOR THE REMOVAL OF NITROGEN OXIDES

This application is a continuation of application Ser. No. 08/263,980, filed Jun. 22, 1994, now abandoned.

The present invention relates to a process for the production of mixed oxide powders for catalysts for the removal of nitrogen oxides from the flue gases (denox catalysts).

Among the various processes that have been proposed for the removal of nitrogen oxides from flue gases (denitration), the selective catalytic reduction (SCR) with ammonia on mixed-oxide catalysts, e.g. according to $$4NO+4NH_3+O_2 \rightarrow 4N_2+6H_2O$$

has gained wide acceptance on a large scale.

According to DE 2 458 888, catalysts suitable for the catalytic reduction consist of (A) Ti in the form of oxides (B) at least one metal from the group B-1 Fe and V in the form of oxides and/or sulphates, and/or the group B-2 Mo, W, Ni, Co, Cu, Cr and U in the form of oxides, (C) Sn in the form of oxides, (D) metals from the group Ag, Be, Mg, Zn, B, Al, Y, rare earth metals, Si, Nb, Sb, Bi and Mn in the form of oxides, wherein the weight ratio A:B:C:D=1:(0.01–10):(0–0.2):(0–0.15). Numerous specific embodiments of these catalysts as well as slightly different compositions are known from the wider technical literature.

Catalysts like these that contain $TiO_2$ in the form of anatase as chief constituent and support and $V_2O_5$ as well as $MoO_3$ and/or $WO_3$ as catalytically active minor constituents have gained special importance industrially. Catalysts like these are disclosed e.g. in EP-A 472 014, EP-A 385 164 and EP-A 317 875.

The catalysts can in principle be produced by any process that ensures a sufficiently intimate mixing of the components:

the components are homogeneously mixed in solution and pyrolyzed together or coprecipitated as hydroxides or carbonates, which are then ignited to give the oxides (homogeneous solution or coprecipitation process according to DE 2 458 888), one part of the components is used in precipitated form, and the other as solution and optionally precipitated, with subsequent calcination (simultaneous application of solution and precipitation processes according to DE 2 458 888), mixing of the solid oxide precursors (e.g. hydroxides) and pyrolysis (precipitate mixing process according to DE 2 458 888).

According to EP-A 385 164, the mixing of the ignited oxides by grinding together is less advantageous from the standpoints of energy consumption and the generation of noise and dust. For reasons of homogeneous distribution also, those processes are in principle to be preferred in which at least one of the components is used in the liquid, e.g. dissolved, form. A combination of solution and precipitate processes is frequently employed.

The mixed oxide powder obtained by one of the aforementioned processes is usually kneaded after the addition of water with suitable additive, for example clays, glass fibers, pore-formers and organic binders, and processed to shaped bodies, e.g. plates or honeycombs, and calcined.

According to EP-A 390 059, the catalysts can also be produced by first mixing only the $TiO_2$ precursor with a $WO_3$ or $MoO_3$ precursor and igniting to a $TiO_2/WO_3$ or $TiO_2/MoO_3$ mixed oxide powder, which is subsequently mixed with the $V_2O_5$ precursor and processed as described above to catalysts for the removal of nitrogen oxides.

In detail, a series of examples is known from the technical literature for the production of $TiO_2$-containing mixed oxide powders for catalysts for the removal of nitrogen oxides, in which aqueous titanium salt solutions, e.g. titanium chloride or titanyl sulphate solutions, are used as the titanium source. It is typical of these processes that an aqueous ammonia solution is used as the component with alkaline reaction for precipitation.

Thus according to DE-A 2 458 888, EP-A 292 310 and EP-A 208 434, orthotitanic acid is precipitated with aqueous ammonia solution from a titanium tetrachloride solution and after the addition of the oxides of molybdenum, tungsten and vanadium (or the corresponding precursors) and in some cases further components, processed to catalysts.

Corresponding processes by which the orthotitanic acid is precipitated with $NH_3$ from a titanyl or titanium sulphate solution originating from the sulphate process are quoted in DE-A 2 458 888, EP-A 214 085, EP-A 256 359 and EP-A 472 014.

Similar processes in which not $TiO_2$, but a mixture of $TiO_2$ and $SiO_2$, is used as support, but wherein the $TiO_2$ is likewise obtained by precipitation with $NH_3$ from a titanium tetrachloride or titanyl sulphate solution, are mentioned in DE-A 3 619 337 and DE-A 3 438 367.

Further processes for the production of suitable mixed oxide powders or catalysts with $TiO_2$ as chief constituent start out from suspensions of titanium oxide hydrates (ortho-, metatitanic acid), such as arise for example in the course of the sulphate process by hydrolysis of titanyl sulphate solutions. As is known to the expert, these hydrolyzates typically contain between 20 and 40 wt % $TiO_2$ as well as between 5 and 10 wt % adsorbed $H_2SO_4$ (relative to $TiO_2$), because of which their reaction is distinctly acidic, with pH values of between 1 and 2.

This sulphate content is too high for direct processing to mixed oxide powders for nitrogen oxide removal catalysts:

JP 02/083 034 teaches that mixed oxide powders of $TiO_2$ and oxides of vanadium, tungsten or molybdenum at sulphate contents above 4.0% tend to undesirable particle aggregation and furthermore that the mechanical strength of the catalyst is reduced.

It is also known that sulphate ions, owing to their double negative charge, generally have a strongly flocculating action on suspensions. According to EP-A 214 085 and DE-A 2 658 569, on the other hand, it is advantageous if the hydrolyzate exists in a sol state before processing. This can be achieved e.g. by the addition of barium ions, which precipitate a part of the adherent sulphate ions arising from the process in the form of insoluble barium sulphate. It is disadvantageous in this case, however, that the product then contains catalytically inactive, inseparable $BaSO_4$.

According to EP-A 390 059 as well as EP-A 268 265, a $TiO_2/WO_3$ or $TiO_2/MoO_3$ mixed oxide powder is produced by addition of ammonia to a Ti oxide hydrate slurry up to a pH value of 8.5, subsequent addition of ammonium paratungstate or paramolybdate followed by calcination. The purpose of the ammonia addition in this process is to reduce the sulphate content by converting the previously adsorbed sulphate into free ammonium sulphate, which sublimes off in the calcination step.

All known processes—both those that start out from titanium salt solutions and those that start out from titanium dioxide hydrate suspensions—have in common the use of ammonia as alkalizing component. From the standpoint of the end product, ammonia has in principle the advantage that the ammonium salts formed as by-products during the precipitation and neutralization, e.g. according to

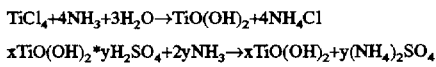

$xTiO(OH)_2 \cdot yH_2SO_4 + 2yNH_3 \rightarrow xTiO(OH)_2 + y(NH_4)_2SO_4$ (where $xTiO(OH)_2 \cdot yH_2SO_4$ means a titanium dioxide hydrate suspension with adherent sulphuric acid from the sulphate process) can easily be removed by washing out and calcination and, as an additional positive effect, the sulphate content can optionally be reduced.

From the standpoint of the overall process, however, the formation of ammonium salts must be judged a decidedly negative factor because these lead, for example in the calcination steps of the processes disclosed in EP-A 390 059 and EP-A 268 265, to blockage and corrosion problems in the furnaces used for this purpose. Furthermore there arise as by-products of the precipitation processes quoted, considerable quantities of dilute aqueous ammonium chloride or ammonium sulphate solutions, whose environmentally acceptable waste disposal requires a considerable expenditure.

Processes in which an alkaline liquor, for example caustic soda, can be used instead of ammonia for the precipitation and neutralization are indeed mentioned in principle in DE 2 458 888 but have never in practice been taken into consideration or carried out, although in addition to the advantage in price through the use of caustic soda, which is considerably cheaper than ammonia, such a process would also offer great advantages with regard to ecology, since instead of ammonium chloride and ammonium sulphate solutions, less problematic sodium chloride and sodium sulphate solutions, that could be disposed of for example by electrolysis, would be obtained.

This process, mentioned incidentally, has also therefore never been carried out, because it is known from EP-A 159 959, DE-A 2 658 569 and publications by K. Limper ("SCR/SNCR processes for $NO_x$ diminution in power stations/large-scale combustion plants and waste incineration plants-Steinmüller System", VDI Educational Work, German Engineers' Association BW 86, page 11), and by F. Hilbrig ("Contributions on the nature of $TiO_2$-supported tungsten oxide", Dissertation, Munich 1989, page 3) that alkali metals are catalyst poisons that lessen the degree of removal of nitrogen oxides. For this reason the lowest possible content of alkali metal compounds in the starting products was previously striven for, even from the outset, especially since alkali metal salts, in contrast to ammonium salts, cannot be removed directly by sublimation.

This information has led to the conviction in specialist circles that it is impossible to produce $TiO_2/MoO_3/WO_3/V_2O_5$ mixed oxide powders for catalysts for the removal of nitrogen oxides using alkaline liquors as alkaline components, so that an appropriate process for this purpose has not so far been developed.

The object, therefore, is to provide a process that enables mixed oxide powders for catalysts for the removal of nitrogen oxides to be produced simply and at low cost, without the disadvantages of the previous processes.

The present invention provides a process for the production of mixed oxide powders that contain as chief constituent $TiO_2$ in the form of anatase and as minor constituents one or more of the catalytically active oxides $MoO_3$, $WO_3$ and $V_2O_5$, for catalysts for the removal of nitrogen oxides, that is characterized in that a) a titanium dioxide hydrate suspension containing sulphuric acid is partially neutralized with alkaline liquor to a pH value between 4.0 and 6.0 at temperatures between 20° and 100° C., b) the suspension from a) is filtered and the filter cake intensively washed, c) one or more water-soluble salts of the metals Mo, W and V are added in solid or dissolved form to the filter cake from b) and d) the filter cake from c) is dried and at temperatures between 300° and 750° C. calcined. A sulphate-containing suspension of titanium dioxide hydrate (e.g. orthotitanic acid or metatitanic acid) is preferably used as the starting material. The particularly preferred starting material, however, is purified, so-called bleached $TiO_2$ hydrolyzate from the sulphate process, as described in Ullmann's Encyclopedia of Industrial Chemistry, 4th Edition, Volume 18, page 576. The cake obtained by digestion is dissolved in cold water or in dilute acid recycled from the process.

As described by Ullmann's, titanium oxide hydrate is precipitated by hydrolysis at 94°–110° C. Other sulfuric-acid-soluble components of the raw material are precipitated simultaneously, mainly niobium as its oxide hydrate.

Hydrolysis is carried out in brick-lined, stirred tanks into which steam is passed.

After hydrolysis, the liquid phase of the titanium oxide hydrate suspension contains 20–28% $H_2SO_4$ and various amounts of dissolved sulfates, depending on the raw material. The hydrate is filtered off from the solution and washed with water or dilute acid. Even with acid washing, too many heavy metal ions are adsorbed on the hydrate for it to be directly usable in the production of white pigment. Most of the impurities can be removed by reduction (bleaching), whereby the filter cake is slurried with dilute acid (3–10%) at 50°–90° C. and mixed with zinc or aluminum powder. Bleaching can also be carried out with powerful nonmetallic reducing agents (e.g., $HOCH_2$-$SO_2Na$). Such hydrolyzate suspensions preferably contain 20 to 40 wt % solid.

In the first step of the process according to the invention the hydrolyzate is partially neutralized with an alkaline liquor, caustic soda solution preferably being used for economic reasons. It is particularly advantageous to carry out the neutralization with intensive mixing and measurement of the pH value.

The essential feature of the first process step is that the partial neutralization is carried out to a pH value in the weakly acid range, i.e. between 4.0 and 6.0. At lower pH values, one must reckon with too high sulphate contents as well as with the precipitation of hydrous $MoO_3$, $WO_3$ or $V_2O_5$ during the addition in a later step-of soluble molybdates, tungstates or vanadates, whereby the homogeneity of the product suffers. At higher pH values, on the other hand, alkali cations, e.g. sodium ions, are adsorbed to an unacceptable degree by the titanium dioxide hydrate; furthermore the sulphate content falls too much, of which it is known from EP-B 264 000 that it is necessary to stabilize the preferred anatase modification against the undesirable rutilization.

During the partial neutralization, the temperature can be between 20° C. and 100° C.; particularly, however, the operation is carried out between about 30° C. and 60° C.

In the second step of the process according to the invention, the filtration and careful washing of the partially neutralized hydrolyzate follows. In principle, any device can be used for this purpose that permits a very intensive washing of fine precipitates. A number of suitable processes and apparatuses are known to the expert, for example, filtration via a filter press or via a rotary vacuum filter, Moore filtration and cross-current filtration.

For industrial scale, filtration and washing via a rotary vacuum filter using hot deionized water is especially suitable. It has been found that with this arrangement it is possible to reduce the sodium content of about 3% (directly after the partial neutralization and relative to $TiO_2$) to unexpectedly low values of the order of magnitude of less than 50 ppm.

The partially neutralized, filtered and washed hydrolyzate is subsequently suspended in deionized water and the desired amount of $MoO_3$, $WO_3$ or $V_2O_5$ is added in the form of suitable water-soluble salts and the mixture well mixed. Preferably ammonium salts of the corresponding mono- or isopolyanions are used, e.g. ammonium heptamolybdate, ammonium para- or metatungstate and ammonium metavanadate. Both solid salts and solutions can be used.

The suspension so treated is then dried, e.g. by spray drying, and the dried material calcined, for example in a rotary furnace. By calcination at different temperatures between 300° C. and 750° C., products with a broad spectrum of BET surface areas between 50 and 200 m²/g can be obtained.

The mixed oxide powders can be processed in well known way to catalysts for the removal of nitrogen oxides.

The invention is explained in more detail in the following illustrative examples.

EXAMPLE (According to the Invention)

10.5 kg of a usual bleached titanium dioxide hydrate suspension from operation of the sulphate process, with a $TiO_2$ content of 30.2 wt %, corresponding to 3170 g $TiO_2$, was diluted with deionized water to 20 wt %, heated to 60° C. and, in a vessel fitted with stirrer and pH electrode, adjusted to a pH value of 4.0 (at 60° C.) with concentrated caustic soda solution (52 wt % NaOH). The total consumption was 14.24 g NaOH/kg $TiO_2$.

The $TiO_2$ hydrate was then filtered off in portions via polyester filter cloth familiar to the expert, and thoroughly washed with hot deionized water at 80° C. The collected filter cakes were mixed with deionized water to a suspension with a $TiO_2$ content of 20 wt.-%.

1455 g of the suspension, corresponding to 291 g $TiO_2$, were heated to 60° C., 35.9 g solid ammonium paratungstate (89.1 wt % $WO_3$) were added, and after stirring for one hour the product was concentrated in a rotary evaporator at a maximum bath temperature of 50° C. The residue was dried for 18 hours at 130° C.

60.0 g of this intermediate product were calcined at 600° C. for one hour with rotation in a quartz flask. 55.0 g of a $TiO_2/WO_3$ powder, whose analytical data can be found in the table below and which is suitable for the production of catalysts for the removal of nitrogen oxides, were obtained.

From the difference of the $NH_3$ contents determined analytically before and after the calcination it was calculated how much $NH_3$ (or ammonium salts, as the case may be) was emitted during the calcination. This specific $NH_3$ emission, relative to 1 kg calcined end product, is reported in the table.

COMPARATIVE EXAMPLE (According to EP-A 390 059, Example 1)

The usual bleached titanium dioxide hydrate suspension from operation of the sulphate process and quoted in the example hereinabove, with a $TiO_2$ content of 30.2 wt %, was first diluted with deionized water to 30.0 wt %.

In accordance with EP-A 390 059, Example 1, aqueous ammonia solution was added to 2400 g of this suspension, corresponding to 720 g $TiO_2$, to adjust the pH value to 8.5 (at RT, about 30° C.). For this purpose, 111.4 g of a concentrated aqueous $NH_3$ solution (30 wt %) were used. After the addition of 90.0 g solid ammonium paratungstate (89.1 wt % $WO_3$) and kneading for one hour, the mixture was concentrated on a rotary evaporator at a maximum bath temperature of 60° C. and dried at 130° C.

60.0 g of this intermediate product were calcined at 600° C. for one hour with rotation in a quartz flask. (Contrary to the instructions of EP-A 390 059, the duration of calcination was reduced for reasons of scale). 54.3 g of a $TiO_2/WO_3$ powder, which is suitable for the production of catalysts for the removal of nitrogen oxides and whose analytical data can be found in the table, were obtained. The specific $NH_3$ emission indicated there was determined from the difference between the $NH_3$ contents before and after the calcination.

TABLE

| Analytical Data of the $TiO_2/WO_3$ powder | | |
|---|---|---|
| | Example | Comparison |
| $Na_2O$ [ppm] | 20 | 22 |
| $SO_4^{2-}$ [%] | 2.66 | 2.75 |
| BET [m²/g] | 87 | 81 |
| specific $NH_3$ emission [g $NH_3$/kg end product] | 6.0 | 24.3 |

The analytical data show that it is possible by the process according to the invention to obtain a mixed oxide powder corresponding to the prior art and suitable for the production of catalysts for the removal of nitrogen oxides.

Surprisingly, despite the use of caustic soda solution, the content of harmful sodium by the process according to the invention is about as low, and thus about as favorable, as that by the prior art. The sulphate content is below 4%, as required by JP 02/083034. The specific surface areas of the two powders are comparable. The advantage of the process according to the invention becomes evident in the specific $NH_3$ emission during the calcination; in the example of the present invention, the concentration of ecologically undesirable $NH_3$ or corrosive ammonium salts in the waste gas and waste water of the calcination furnace is reduced by not less than 75%.

It will be understood that the specification and examples are illustrative but not limitative of the present invention and the other embodiments within the spirit and scope of the invention will suggest themselves to those skilled in the art.

We claim:

1. A process for the production of a mixed oxide powder, that contains as chief constituent $TiO_2$ in the form of anatase and as minor constituents at least one of the catalytically active oxides $MnO_3$, $WO_3$, and $V_2O_5$, suitable for use as a catalyst for the removal of nitrogen oxides, comprising (a) forming a suspension of titanium oxide hydrate by thermally hydrolyzing a titanyl sulphate solution obtained by digesting titanium-containing raw material with sulphuric acid, oleum or both, filtering the resulting titanium oxide hydrate out of the solution, optionally bleaching it, and then adding it to water to form a titanium dioxide hydrate suspension, (b) partially neutralizing the suspension from (a) with alkaline liquor to a pH value between 4.0 and 6.0 at a temperature of from 20° to 100° C., (c) filtering the partially neutralized suspension to produce a filter cake and intensively washing the filter cake, (d) adding at least one water-soluble salt of at least one metal selected from the group consisting of Mo, W and V, in solid form, to the filter cake, and (e) drying the filter cake and calcining it at a temperature between 300° and 750° C.

2. A process according to claim 1, wherein the titanium dioxide hydrate suspension containing sulphuric acid comprises a bleached hydrolyzate suspension from the $TiO_2$ production process according to the sulphate process.

3. A process according to claim 2, wherein the bleached hydrolyzate suspension contains about 20 to 40 wt. % solids.

4. A process according to claim 1, wherein the alkaline liquor is a sodium hydroxide solution.

5. A process according to claim 1, wherein the filtration and washing in step (b) is carried out in a rotary vacuum filter.

6. A process according to claim 1, wherein the water-soluble salts in step (c) are selected from the group consisting of an ammonium salt of a mono- or isopolyanion of Mo(VI), W(VI) or V(V).

7. A process according to claim 1, wherein the drying in step (d) is carried out by spray drying.

8. A process according to claim 3, wherein the alkaline liquor is a sodium hydroxide solution, the filtration and washing in step (b) is carried out in a rotary vacuum filter, the water-soluble salts in step (c) are selected from the group consisting of an ammonium salt of a mono- or isopolyanion of Mo(VI), W(VI) or (V(V), and the drying in step (d) is carried out by spray drying.

9. The product produced by the process of claim 1.

10. In the catalytic removal of nitrogen oxides from flue gases, the improvement which comprises employing as the catalyst a catalyst manufactured from the product according to claim 9.

* * * * *